Patented Jan. 28, 1941

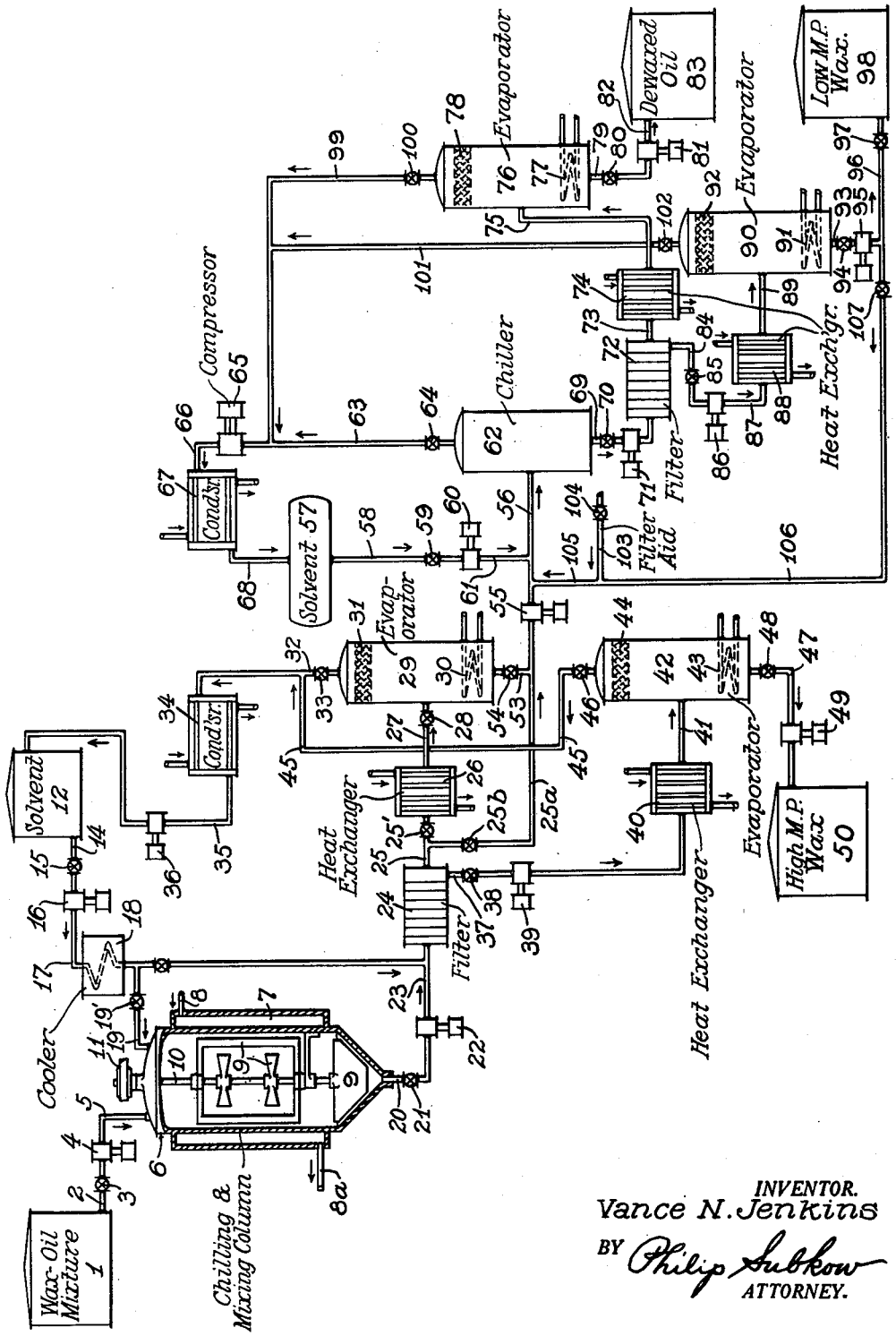

2,229,658

UNITED STATES PATENT OFFICE 2,229,658

PROCESS FOR SEPARATING WAX FROM OIL

Vance N. Jenkins, Palos Verdes Estates, Calif., assignor to Union Oil Company of California, Los Angeles, Calif., a corporation of California Application October 18, 1937, Serial No. 169,672

6 Claims. (Cl. 196—18)

The present invention relates to the separation of oil and wax from wax-oil mixtures such as waxy oils or oily waxes. The invention relates particularly to a process for separating wax and oil from wax-oil mixtures to produce low pour test lubricating oils and high melting point waxes. The invention also relates to a process for treating slack wax to produce extremely high melting point waxes.

In a conventional process for separating wax from oil, the latter is chilled to a temperature sufficiently low to crystallize the wax contained in the oil. The precipitated wax is then separated from the oil by high pressure filtration. This type of operation is limited to oils of not over about 100 seconds Saybolt Universal viscosity at 100° F. because more viscous oils cannot be filtered successfully in this manner at the temperatures necessary to employ in order to obtain the desired degree of wax removal. The wax removal is not complete with this method of operation and, therefore, the pour point of the dewaxed oil is seldom below about 25° F. to 30° F. No washing of the wax cake on the filter is done in this type of operation and it is not unusual for the wax cake to contain as much as 70% of oil which must be removed before the wax is marketable.

Distilled waxy oils more viscous than about 100 seconds Saybolt Universal at 100° F. are normally dewaxed by dissolving the waxy oil in a solvent or mixture of solvents at an elevated temperature and then chilling the solution to a temperature sufficiently low to effect precipitation of the wax which is subsequently removed by low pressure or vacuum filtration. The solvents employed are those which show a preferential solubility for oil over wax at the dewaxing temperature, such as various mixtures of benzene and acetone, benzene and methyl ethyl ketone, propane, naphtha, etc. These solvents are very fluid at low temperatures and reduce the viscosity of the oil to such an extent that very low temperatures may be employed with the result that oils dewaxed by this type of operation may have pour points lower than 0° F. Washing of the wax cake on the filter with fresh cold solvent is usually carried out. However, the type of structure assumed by the wax when precipitated from the solvents adapted for use is such that the wax cake is very voluminous and porous. This leads to rapid filtration but the cake retains a large amount of solvent and dissolved oil and its porosity causes it to wash poorly. It is not unusual for washed wax cakes obtained in this type of operation to contain as much as 60% or more of oil. The weight of solvent present in the so-called dry cake is usually 2 to 4 times that of the wax present. This type of operation gives a soft wax cake which cracks badly and such cracking leads to very poor washing qualities. With many types of oils and solvents, it is necessary to add crystallization modifiers to the oil before chilling the waxy oil solution in order to obtain a slurry which may be filtered at an economical rate.

The above is particularly true in the refining of wax-oil mixtures containing high melting point waxes as in the case of distilled oils of high viscosity. It has been observed that such oils form more voluminous precipitates that oils containing low melting point waxes when equal weights of the two waxes are crystallized from equal dilutions in the same solvent. As a result, when an oil containing high melting point wax is dewaxed by any of the conventional solvent dewaxing processes, the yield of dewaxed oil is lower than that obtained by dewaxing in the same solvent and in the same solvent ratio an oil which contains the same amount of low melting point wax. The reason for this is that the more voluminous wax cake obtained from the oil containing high melting point wax retains a greater percentage of the oil-solvent solution than does the less voluminous wax cake obtained from the oil containing the low melting point wax. This difference in yields is especially noticeable in the dewaxing of solvent-extracted raffinates of high wax contents as the oils have been stripped of any naturally-occurring filter aids by the process of solvent extraction.

Residual oils can be dewaxed by the above described type of operation but such high viscosity products are usually treated by the cold settling type of operation or a modification of it usually called the "centrifugal process." In this type of operation, the waxy oil is dissolved at an elevated temperature, in a solvent such as naphtha and the solution is cooled to a low temperature to effect precipitation of the wax which is then removed by settling or centrifuging. The wax removed by this type of operation may contain as high as 80% oil.

It has been the goal of every worker in the field of dewaxing to design a process whereby in one or two operations, a wax-oil mixture might be completely separated into wax-free oil and oil-free wax. The meager success attending their efforts is seen when one inspects the type of products obtained from the conventional types of operation outlined above.

I have made certain observations which have led me to realize that such a process is possible if the type of structure shown by wax solidifying in the oil with which it is associated could be preserved in a non-viscous solvent. I have been able to preserve the type of wax structure in a non-viscous solvent as it solidifies in the associated oil and as a result I have invented a process or method of operation whereby the majority of wax-oil mixtures can be separated into substantially wax-free oil and oil-free wax in one operation. With certain oils or waxes, it may be necessary to subject them to two operations in order to secure wax-free oil and oil-free wax from them. Also, where certain types of solvents are used, it may be necessary to subject the oil or wax treated with them to several operations to secure the desired results. According to my invention, any of the solvents or mixture of solvents ordinarily used for dewaxing and deoiling operations may be used. For deoiling waxes, certain solvents may be used which are not applicable for use in dewaxing oil operations. The substantially oil-free waxes obtained in the operation of my invention may be made water-white in color by merely subjecting them to a treatment with a small amount of clay, no acid treatment being necessary.

Thus, it is an object of my invention to separate wax-oil mixtures into its constituent components in a very simple and economical manner.

A further object of my invention resides in separating a wax-oil mixture into substantially oil-free wax of high melting point and wax-free oil of low pour test.

An important object of my invention resides in preserving in the presence of a non-viscous solvent the type of wax structure developed when crystallization occurs in the oil originally associated with the wax-oil mixture.

Another object of the invention is to produce wax cakes by filtration which do not crack during filtration or washing so that perfect washing is obtained which completely removes both oil and solvent from the wax cake.

Other objects and features of my invention will be apparent from the following description of the invention.

According to my invention, I effect crystallization of the wax in the wax-oil mixture in the absence of a solvent or in the presence of a very limited amount of solvent so that the formation of the wax structure will be of the desirable type. I have discovered that the wax-oil mixture may then be mixed with a small amount of a poor wax solvent, i. e., a solvent having low solvent power for wax, without disturbing the desirable wax structure. Very little of the crystallized wax will be redissolved and a slurry is formed which filters very rapidly; also a compact wax cake is formed on the filter which will not crack during filtration or while washing with solvent.

In the separation of high melting point waxes from wax-oil mixtures, I preferably cool the wax-oil mixture; for example, a slack wax obtained from the conventional dewaxing of oils, or a waxy raffinate, and which has been heated to effect removal of solvent and a solution of the wax content in the oil to atmospheric temperature or lower while maintaining the wax-oil mixture fluid by continual stirring. I find that under such conditions of operation, the greater percentage of the high melting point wax separates in the form of large, well-defined, oil-free crystals. If the wax-oil mixture containing the high melting point wax in this well crystallized condition is then mixed or dispersed with a small amount of a poor wax solvent, very little of the wax is redissolved and a slurry is formed which filters very rapidly. If this slurry is then filtered and the wax cake obtained is washed on the filter with a small amount of solvent, the wax cake will be found upon freeing of retained solvent to be high melting point wax representing a considerable proportion of the total wax present in the original wax-oil mixture. It will contain less than 1% of oil and be very light in color so that a treatment with 1 to 5% of filter clay at 350°–400° F. will make a water-white marketable product of it.

In the treatment of wax-oil mixtures which are extremely viscous at temperatures even above 100° F. so that it is difficult to continue the cooling with stirring to atmospheric temperatures or lower, I have discovered that by mixing a small amount of the non-viscous poor wax solvent in the wax-oil mixture after it has been cooled with stirring from a temperature of above 100° F., that the subsequent cooling of the diluted mixture may be effected to atmospheric temperature or lower and yet the benefits of my invention may be had even though solvent is added to dilute the viscous mass prior to the attainment of the final dewaxing temperature. In other words, I have found that precipitation of a portion of the wax from a solution of oil and solvent is a satisfactory method of operation where the desired wax content has been precipitated from the mother oil with slow cooling and continual stirring or agitation. I have found that the further cooling in the presence of a solvent results in the precipitation of low melting point wax which becomes redissolved in solvent when the required amount of solvent is mixed with the chilled mass in order to produce a slurry of economical filtration consistency. This resolution of the low melting point wax takes place even though the solvent is mixed with the chilled mass at the same temperature of the chilled mass. Thus, in one of my preferred methods of operation, I subject a molten or fluid wax-oil mixture to cooling with stirring in the absence of a solvent to crystallize substantially all of the wax content desired to be separated from the wax-oil mixture; then I mix a small amount of the solvent with the thus cooled mixture and effect a solution of the oil in the solvent, thereby reducing the viscosity of the chilled mass; then I subject the chilled mass to further cooling which results in a precipitation of further quantities of wax, i. e., lower melting point wax; then I mix with the thus cooled mass a further amount of solvent to reduce the viscosity of the mixture appreciably to permit rapid filtration and then filter the thus diluted mixture. I have found that by operating in this manner it is possible to separate the desired wax content from the wax-oil mixture by filtration and yet produce a compact wax cake which may be washed with solvent without cracking of the wax cake so that perfect washing is obtained.

I have found the process forming the subject matter of my invention to be particularly advantageous when operated on high viscosity index raffinates when the yield of oil is of first importance. As heretofore mentioned, the treatment of wax-oil mixtures containing high percentages of high melting point waxes, such as the solvent-extracted raffinates of high wax contents and high viscosities by the conventional dewaxing processes, result in more voluminous precipitates than low melting point waxes and under such circumstances a lower yield of oil is obtained by filtration than would be obtained from wax-oil mixtures containing the same amount of low melting point wax which are dewaxed under similar conditions.

When operating on such raffinates and it is desired to produce a high yield of low pour test oil and a high melting point wax, I have found it desirable to operate the process in two stages. In the first stage the raffinate is heated to a temperature sufficient to completely dissolve the wax in the contained oil, after which the heated raffinate is allowed to cool with constant stirring to atmospheric temperature or lower so that the greater percentage of high melting point wax is crystallized in the form of large, well-defined, oil-free crystals. It is preferable to add a small amount of a poor wax solvent to the wax-oil mixture before it is cooled to the final dewaxing temperature when the slurry becomes so thick that it is difficult to stir and subsequent to the crystallization of substantially all of the desired high melting point wax. When the raffinate has been cooled to the desired dewaxing temperature, a small amount of the poor wax solvent is mixed with the cooled raffinate to form a slurry which filters rapidly. As solvents for admixture with the cooled raffinate, I may use methyl ethyl ketone or any of the solvents hereinafter mentioned. The amount of solvent used will depend of course upon the desired viscosity of the resulting slurry. I have found that I may use as little as 0.25 to 0.75 volume of the wax raffinate treated to obtain a slurry which filters readily although I have used as much as 1.5 to 2.5 volumes of the solvent. In adding solvent to the cooled raffinate, it is not necessary to add sufficient solvent to dissolve all of the oil in the cooled raffinate. The addition of sufficient solvent to lower the viscosity of the oil to obtain rapid filter rates is all that is necessary.

If desired, a light hydrocarbon oil fraction, such as a light lubricating oil or gas oil from which wax is known to separate by cooling in the desired crystal form, may be used as the solvent or diluent for the partially cooled wax oil mixture to lower its viscosity sufficiently to permit further cooling to the desired dewaxing temperature without forming a solid or non-fluid mass. To the mixture diluted with the oil at the desired dewaxing temperature, the required amount of the pre-chilled dewaxing solvent may be added. The chilled oil and solvent are stirred together to produce a uniform slurry. If desired, the light oil may be mixed with the wax-oil mixture at an elevated temperature prior to any of the cooling steps although it is preferable to add the solvent or light hydrocarbon oil to the wax-oil mixture subsequent to partial cooling, i. e., after the desired high melting point wax has been crystallized.

The slurry produced in either of the above two methods is then filtered in the usual manner and the wax cake is washed on the filter with a small amount of the solvent to remove entrained oil and solvent solution. For this purpose, I have used successfully as little as 0.125 to 0.25 volume of the waxy raffinate treated. The wax cake when freed of the retained solvent was found to be a high melting point wax representing over 50% of the total wax present in the waxy raffinate treated. It contained less than 1% of oil and was very light in color so that a treatment with a very small amount of clay produced a water-white marketable wax.

In working with such high viscosity index and high viscosity waxy raffinate, with certain solvents such as methyl ethyl ketone, it is sometimes observed that the filtrate separates into two phases, one which is rich in solvent and one which is rich in oil. This is particularly true where low solvent ratios are used. However, this does not interfere with the successful operation of the process since the filter cakes obtained by this method of operation do not crack during filtration or washing and perfect washing is obtained which completely removes both liquid phases from the wax cake. However, in order to prevent this separation into two phases, I find it desirable to use a mixture of solvents for the purpose; for example, a mixture of benzene and methyl ethyl ketone.

Thus in the first stage of operation, a high melting point, oil-free wax is produced. The filtrate of the first stage of operation which, when freed of solvent, contains less than 50% of its original wax content and practically all of this wax is of low melting point when compared with the portion of the wax removed in the first stage of operation. In order to produce the low pour test oils from the filtrate, it is subjected to chilling to a sufficiently low temperature in the second stage of operation in order to precipitate the remaining wax content and the chilled mixture is then filtered. The chilling to the desired dewaxing temperature in the second stage of operation may be carried out in exactly the same manner as in the first stage of operation. For example, the filtrate from the first stage may be freed of solvent and the partially dewaxed raffinate preferably at a temperature above complete solution of the wax in the oil is cooled with constant stirring to a sufficiently low temperature to crystallize all of the remaining wax content. As in the first stage of operation, a small amount of solvent may be mixed with the raffinate at an intermediate point of chilling so as to permit the further cooling with stirring without difficulty. When the raffinate has been cooled to the desired temperature, it is mixed with the required amount of solvent and the mixture is then filtered as before. The solvent employed in the second stage of operation may be the same or a different solvent than that employed in the first stage of operation. I have found, however, that in many cases it is desirable to use a different solvent in the second stage than in the first stage. This is particularly true when the solvent in the first stage has a poor solvent power for oil at extremely low temperatures of 0° F. and lower which are necessary to precipitate substantially all of the wax in the oil.

Instead of carrying out the second dewaxing stage in the above manner, I may effect the final dewaxing by dissolving the partially dewaxed raffinate with a solvent such as liquid propane under pressure and temperature conditions sufficient to completely dissolve the wax and oil in the solvent. The solution may then be chilled at a gradual rate of say 3° to 4° F. per minute until it has been cooled to 0° to —40° F., after which it may be filtered to separate the soft wax from the solution of oil and propane.

In case a mixed solvent dewaxing process is to be used for the final dewaxing operation, there is no need to remove the solvent from the filtrate at this stage if the solvent is properly chosen. For example, if benzene-methyl ethyl ketone is to be used as a solvent for the final dewaxing stage and methyl ethyl ketone has been used in the first stage, it is only necessary to add benzene in the correct amount to the filtrate before proceeding to chill the solution to the final dewaxing temperature.

In some cases, it is desirable to introduce into the partially dewaxed oil, filter aids such as asphalt and oxidized wax prior to the dewaxing operation. These may be added before and/or after the cooling step.

In cases where my process is used to treat slack waxes which have been separated from oils by the conventional methods of operation, it is desirable to use a dewaxing aid which is insoluble in the solvent employed in the conventional dewaxing process at the temperature of filtration used, but which is soluble in the solvent employed in my process to separate the high melting point wax and oil from the slack wax. I have found oxidized wax to be particularly suitable in such processes. Thus, in deoiling such slack waxes containing the filter aid, the solvent will dissolve the filter aid as well as the low melting point waxes and oil and this solution may be recycled either with the solvent or after being freed of solvent to the waxy oil undergoing the conventional dewaxing.

The foregoing two-stage dewaxing process has been described with reference to the treatment of raffinates. It will be understood that I may treat any wax-oil mixture in two stages as above whether it be an oily wax, such as a slack wax which has been separated from oil by conventional dewaxing processes, or a waxy oil such as raw waxy distillate or raffinate.

As solvents for carrying out my process, that is, when the solvent is added to the wax-oil mixture after partial or total crystallization of the wax, I may employ in addition to the methyl ethyl ketone mentioned above, other poor wax solvents such as butyl, amyl or propyl alcohol or mixtures thereof; various esters such as ethyl acetate, ethers such as diethyl ether or isopropyl ether, chlorinated hydrocarbons such as ethylene dichloride, trichlorethylene and other ketones such as acetone. In case where high viscosity index oils are to be treated, I may employ a mixture of benzene or naphtha or an aromatic solvent and any of the above solvents in order to obtain complete miscibility of the oil with the solvents at the temperature of operation.

As solvents for the final dewaxing stage, I may employ liquefied normally gaseous hydrocarbons such as ethane, ethylene, propane, propylene, butane, iso-butane, butylene or mixtures thereof, or I may use other normally gaseous diluents such as methyl ether, methyl chloride and dichlor-difluor-methane. These materials, in addition to diluting the oil so as to permit rapid filtration, also have the property of chilling the wax-oil mixture when evaporated from the solution under reduced pressure. If desired, normally liquid solvents may be used such as gasoline, casinghead gasoline, naphtha, acetone, esters, mixtures of benzene and acetone, pentane, hexane and mixtures of any of the solvents employed in the first mentioned solvents, such as methyl ethyl ketone with benzene.

The method of operation of my invention may perhaps be better understood by reference to the description of the drawing. Referring to the drawing, a waxy stock, for example, a raffinate derived from the selective solvent extraction of an S. A. E. 50 waxy distillate produced by the vacuum distillation of a Santa Fe Springs crude oil, or the raw distillate itself or other raw distillates or raffinates obtained from waxy crude oils or the slack waxes obtained from such oils, or a crude oil residue containing wax is maintained in tank 1 at a temperature sufficiently high to effect solution of wax contained in the oil. It is withdrawn from tank 1 through line 2 controlled by valve 3 and is pumped by pump 4 through line 5 into chilling and mixing column 6. Column 6 is provided with a jacket 7 around it, into which a cooling liquid to cool the wax-oil mixture may be introduced via line 8 and withdrawn via line 8a. Column 6 is also provided with agitating or stirring paddles and scrapers 9 on shaft 10 which is rotated by pulley 11 connected to a suitable source of power not shown. The molten wax-oil mixture is gradually cooled in column 6 to the desired temperature while it is constantly stirred by the agitating paddles and scrapers. The stirring is conducted very slowly at a rate merely sufficiently to prevent the wax-oil mixture from setting up into a solid non-fluid mass.

When the desired temperature on the wax-oil mixture has been reached, a poor wax solvent such as methyl ethyl ketone or other poor wax solvents herein mentioned, is mixed with the wax-oil mixture in order to produce a slurry which filters readily. Such solvents may be mixed with the cooled wax-oil mixture in column 6 and are withdrawn from storage tank 12 via line 14 controlled by valve 15 and pumped by pump 16 through line 17, cooler 18 and line 19 controlled by valve 19' into the column. The solvent is preferably cooled to the temperature prevailing in column 6 or to a lower temperature so as to prevent resolution of crystallized wax. If desired, a portion of the solvent may be mixed with the wax-oil mixture prior to cooling of the latter to the final filtration temperature.

After the solvent has been mixed with the cooled wax-oil mixture containing the desired crystallized wax, the resulting slurry is withdrawn from the bottom of the column via line 20 controlled by valve 21 and the slurry is pumped by pump 22 through line 23 to filter 24 where the wax suspended in the slurry by chilling is separated from the oil and solvent. The oil solvent solution is then passed through line 25 valve 25' and heat exchanger 26 where the temperature is raised so as to permit vaporization of the solvent. The preheated solution is then passed through line 27 controlled by valve 28 into the evaporator 29. The solvent is vaporized in the evaporator aided by steam circulated through closed coil 30, the vapors passing through mist extractor 31 being withdrawn via line 32, condensed in condenser 34 and the condensate is controlled by valve 33, returned to the storage tank 12 via line 35 and pump 36.

The wax separated in filter 24 is withdrawn via line 37 controlled by valve 38 and is pumped by pump 39 through heat exchanger 40 where it is heated to a sufficiently elevated temperature to effect vaporization of the solvent. The heated wax is then passed via line 41 into evaporator 42 which is provided with closed heating coil 43 and mist extractor 44. The solvent vapors are recovered from the evaporator via line 45 controlled by valve 46 and are passed into line 32 for passage to the condenser 34 and return to the storage tank 12. The solvent-free wax is withdrawn via line 47 controlled by valve 48 and is pumped by pump 49 into storage tank 50.

Prior to the removal of the wax cake depositing on the filtering element of filter 24, it is preferable to wash the wax cake with a small amount of the same solvent from tank 12. Solvent may be passed into the filter via line 51, controlled by valve 52 and line 23. The solvent containing the washed constituents of the filter cake may also be passed to evaporator 29.

The oil freed of solvent in evaporator 29 may be passed to storage, or if the oil contains low melting point wax such as it would contain if the wax crystallization in column 6 was carried out at a temperature sufficiently high to crystallize only the high melting point wax, it is subjected to further dewaxing at a lower temperature. If it is desired to further dewax the oil, it is withdrawn from the evaporator via line 53 controlled by valve 54 and is pumped by pump 55 into line 56 where it is mixed with solvent; for example, liquefied propane under pressure withdrawn from tank 57 via line 58 controlled by valve 59 and pumped by pump 60 through line 61 into line 56. The solution of propane and oil is then passed under pressure into chiller 62 where the solution is chilled to a sufficiently low temperature to crystallize substantially all of the wax contained in the solution. The chilling may be accomplished by opening valve 64 on line 63 which reduces the pressure in the chiller and allows a portion of the propane to vaporize. By reducing the pressure to atmospheric, temperatures as low as −40° F. may be obtained on the resulting slurry in the chiller. It is preferable to gradually reduce the pressure to accomplish the chilling so that the chilling rate is not appreciably greater than 3 or 4° F. per minute. Propane vaporized from the solution passes via line 63 and valve 64 to the suction of compressor 65 where the gases are compressed and passed into line 66 and condenser 67 where the propane is condensed. The condensed propane is returned to storage tank 57 via line 68.

When a temperature of about 0° to −40° F. is attained in the chiller, the resulting slurry is withdrawn via line 69 controlled by valve 70 and is pumped by pump 71 into filter 72 where the wax suspended in the slurry is separated from the oil and propane. The filtrate is passed via line 73, heat exchanger 74 and line 75 into evaporator 76 provided with closed heating coil 77 and mist extractor 78 where propane is vaporized from the dewaxed oil. The dewaxed oil is withdrawn via line 79 controlled by valve 80 and is pumped by pump 81 through line 82 into storage tank 83.

The wax in filter 72 is withdrawn via line 84 controlled by valve 85 and is pumped by pump 86 through line 87, heat exchanger 88 and line 89 into evaporator 90 provided with closed heating coil 91 and mist extractor 92 where propane is separated from the wax. The depropanized wax is withdrawn from the evaporator 90 via line 93 controlled by valve 94 and is pumped by pump 95 through line 96 controlled by valve 97 into storage tank 98.

The propane vaporized in evaporator 76 is withdrawn via line 99 controlled by valve 100 and that vaporized in evaporator 90 is withdrawn via line 101 controlled by valve 102 and the propane vapors are compressed by compressor 65, condensed in condenser 67 and returned to storage tank 57.

In the event it is desired to operate the second stage of dewaxing with the use of mixed solvents and the solvent for the first stage has been properly chosen, the filtrate from filter 24 may be by-passed around the evaporator 29 via line 25a and valve 25b, and passed directly into line 56 into which the proper amount of the second solvent is introduced from tank 57. If desired, a further amount of the solvent from tank 12 may be added to the partially dewaxed solution in order to provide a proper solvent to oil ratio for the second stage dewaxing operation.

In operating the second stage of dewaxing in the above manner, it is desirable to dissolve a small amount of filter aid; for example, oxidized wax in the partially dewaxed oil prior to the admixture with the solvent. The filter aid may be introduced into the oil flowing through line 56 via line 103 controlled by valve 104 and line 105. The filter aid will precipitate along with the wax in chiller 62 and will be separated along with the wax in filter 72. The wax, after de-propanization, will also contain the filter aid. The wax may be chemically treated as, for example, with sulphuric acid and clay to purify the wax of the filter aid and other impurities. I have found, however, that it is desirable to circulate the depropanized wax containing the filter aid to the partially dewaxed oil passing through line 56 as, for example, via line 106 controlled by valve 107 and line 105.

In cases where the dewaxing of the oil is by conventional methods to produce a relatively low pour point test oil and the slack wax is de-oiled according to my invention, it is particularly desirable to recirculate the low melting point wax containing the filter aid to the original oil to be dewaxed by the conventional method. This will reduce the amount of filter aid to be employed in the process to the amount used initially in starting up and will subject the slack wax to further dewaxing operations. It is perfectly feasible to dewax a wax-bearing oil under conditions in which the solubility of wax is sufficiently low to produce low pour point oil, to deoil the slack wax under conditions in which a fraction of this wax is soluble in the filtrate, and to recycle this second filtrate through the dewaxing process. The feasibility of this process may be explained by the following principles: In the dewaxing of oil or in the deoiling of slack wax, the wax content of the filtrate stream is determined solely by the conditions of wax separation, i. e., temperature and amount of diluent or solvent employed. Low melting point wax for example has at a given temperature, a certain solubility in a given solvent. The amount of a given wax fraction present in a given filtrate will, of course, not exceed the equilibrium concentrations of this filtrate for this wax fraction. Therefore, since the conditions during the deoiling operation uniquely determine the concentration of the low melting point wax in the recycled filtrate, the result over a series of cycles will necessarily be that the low melting point wax content of the deoiled wax is increased until a steady state is reached, at which point the concentration of low melting point wax in the deoiling filtration becomes constant, and the wax produced by deoiling represents the entire range of wax fractions present in the original charge. The deoiled wax cake, following the deoiling step may, if desired, be redispersed in additional solvent and filtered at a higher temperature than employed in the dewaxing or deoiling operations in order to separate the deoiled wax into low and high melting point fractions.

Thus, where filter aid is employed in the dewaxing operation it is advantageous to employ a solvent for the deoiling separation which dissolves the filter-aid under the conditions used. Such a solvent may be methyl ethyl ketone. The filtrate of the deoiling separation may then be recycled to the dewaxing operation with or without the removal of solvent from the solution of oil and low melting point wax.

The following are submitted as specific examples of a number of the various modifications of the process forming the subject matter of my invention. It is to be understood, however, that these are not to be construed as limiting my invention but merely as representative of the typical examples thereof.

Example 1

A waxy raffinate was produced by extracting a waxy distillate having such gravity and viscosity characteristics as to produce a finished S. A. E. 50 lubricating oil. The waxy distillate was extracted with about 3 volumes of phenol at a temperature of 180° F. The raffinate resulting from such extraction had an A. P. I. gravity of 31.5°, a viscosity of 65 seconds Saybolt Universal at 210° F., a pour point of 110° F. and a wax content of approximately 23%. The waxy raffinate was charged to the chilling and mixing column 6 at a temperature of about 160° F. and was cooled to about 80° F. at a rate of about 7° F. per hour. During cooling to 80° F. the contents in the chilling column were constantly stirred by means of the agitating paddles which were rotated at a moderate rate sufficient to prevent the wax mass from setting up into a solid mass. The thus cooled waxy raffinate containing part of the wax content in crystalline form was then mixed with one volume of methyl ethyl ketone containing about 10% of a close-cut straight-run naphtha boiling between 170° F. and 200° F. The slurry was then filtered on a rotary filter under about six inches of vacuum with sixteen inches of vacuum on the washing section of the filter. The cake on the filter was washed with about 0.5 volume of the methyl ethyl ketone-naphtha mixture which was applied as a spray.

The filtration of the slurry was very rapid, the rate being 10 gallons per square foot of filter surface per hour based on the solvent-free oil and a uniform uncracked wax cake was obtained throughout the run, which was completed without any appreciable diminution in filter rate. After removing the solvent from the washed wax cake, it tested 167° F. melting point (Galician), 0.904 specific gravity at 60° F. and appeared to be oil-free. It was recovered in a yield of about 11.5% based on the waxy raffinate. After being treated with only 1% of filter clay, it was a marketable water-white wax.

The filtrate was then subjected to distillation in order to separate the methyl-ethyl ketone and naphtha from the partially dewaxed lubricating oil. This was then mixed with approximately 1% of oxidized wax at a temperature of about 250° F. and the resulting mixture was further mixed with about 3 volumes of liquid propane at a temperature of about 120° F., and under a pressure of about 250 pounds per square inch. The resulting solution was gradually chilled to about —40° F. in order to precipitate the remaining wax from the solution. Chilling was accomplished by gradually reducing the pressure on the solution and vaporizing propane so as to obtain a chilling rate of about 3° F. or 4° F. per minute. Make-up propane was added continuously during chilling in order to maintain a ratio of 3 volumes of propane to one of the oil and wax.

The resulting chilled slurry was then filtered under a differential pressure of about six pounds per square inch to separate the precipitated wax from the chilled slurry. The filtration rate was about 2.5 gallons per square foot of filter area per hour. The filtrate and wax were then de-propanized by distillation. The oil had a pour test of about —10° F., a gravity of about 30.4° A. P. I., a viscosity of 69 seconds Saybolt Universal at 210° F. and an N. P. A. color of 3. It was recovered in a yield of about 65% based on the original waxy raffinate.

The wax had a melting point of about 115° F. and was recovered in a yield of about 23% based on the original waxy raffinate. This wax contained about 50% oil which may be removed by subjecting the wax to a deoiling operation in accordance with the first stage described above.

Example 2

A raw lubricating oil distillate obtained from Santa Fe Springs crude oil having an A. P. I. gravity of 18.5°, a viscosity of 130 seconds Saybolt Universal at 210° F. and a pour point of 125° F., was dissolved in 2.5 volumes of liquid propane at 110° F. Approximately 1% of oxidized wax was dissolved in the lubricating oil prior to the admixture with the propane. The solution was then gradually chilled to —40° F. by vaporizing propane from the solution under reduced pressure. The vaporization of propane was controlled to effect the chilling at a rate of about 3° or 4° F. per minute, make-up propane being added to maintain the ratio of 2.5 volumes of propane to one of the oil. The resulting slurry was then filtered at a rate of approximately 0.5 gallon per square foot per hour. The filtrate was then de-propanized by distillation and the recovered lubricating oil had a pour test of 5° F., an A. P. I. gravity of 19.0°, a viscosity of 135 seconds Saybolt Universal at 210° F. and was recovered in a yield of about 70%. The wax after vaporizing the propane had a melting point of 132° F. and was recovered in a yield of about 30%.

The molten wax containing the filter aid at a temperature of about 150° F. was then placed in the chilling column provided with agitating paddles and scrapers and with a water jacket through which water was circulated at 150° F. The temperature of the circulating water was then slowly lowered so that at the end of 1½ hours, the temperature of the wax was reduced to about 132° F. During cooling the wax was continually stirred. The wax was maintained at this temperature for an additional 30 minutes to allow crystallization of the higher melting point wax and thus to seed the mass with a large number of well-formed crystal nuclei. The temperature of the circulating water was then lowered slowly so that the wax had reached a temperature of about 90° F. after three and one-half hours of additional stirring. At this temperature the wax was quite plastic and easily stirred, and would pour from the container if inverted. About 2.5 volumes of methyl ethyl ketone at 55° F. were added to the wax giving a resulting temperature of about 70° F. to 75° F. The mixture was agitated until the wax was dispersed in the solvent and the resulting slurry was then filtered under vacuum. The cake was then washed on the filter with 0.25 volume of fresh solvent. A yield of about 20.4% by weight of 159° F. to 160° F. melting point (Galician) wax was obtained, this being water-white in color after being treated with 5% of filter clay at 325° F. The filtration took place at a rate of about 10 gallons per square foot of filter area per hour. There was no tendency for the cake to crack on washing on the filter.

The filtrate contained the low melting point wax and the filter aid in solution in the solvent. If desired, the filtrate may be stripped of solvent and the resulting oil and low melting point wax be recycled to the raw lubricating oil distillate for further dewaxing.

*Example 3*

A slack wax was obtained from a raw lubricating oil distillate with the use of propane in a manner similar to that described in Example 2. The wax was first treated with about 5% clay at a temperature of about 400° F. in order to remove the filter aid used to separate the wax from the original distillate. The wax was then cooled from a temperature of about 145° F. to about 95° F. as in Example 2 at an average rate of about 6° F. per hour. At that point, a mixture of 90% methyl ethyl ketone and 10% straight-run naphtha boiling from 170° F. to 200° F. and equal in volume to 10% of that of the wax charge was added, and the stirring and cooling was continued for about four hours until a temperature of about 75° F. was reached. At this point, a further amount of the solvent was mixed with the cooled wax and solvent in an amount sufficient to bring the total volume up to about 1.5 times that of the wax charge. After continuing the agitation for about 15 minutes, the slurry was filtered. The resulting wax cake was washed with about 0.5 volume of the solvent. After treating the wax cake as in Example 2, a water-white wax of high melting point was obtained.

*Example 4*

A waxy raffinate was produced as in Example 1 from a waxy distillate, having an A. P. I. gravity of 21.5°. The waxy raffinate produced had a gravity of 33° A. P. I., a viscosity of 50 seconds Saybolt Universal at 210° F., a pour point of 110° F., and a wax content of approximately 23%. The waxy raffinate was cooled with stirring to a temperature of about 35° F. at a rate of about 5° F. per hour. The thus cooled waxy raffinate was then introduced into about 2.5 volumes of a 60% benzene —40% acetone mixture maintained at a temperature of —10° F. and the waxy raffinate was dispersed with the solvent by stirring. The resulting slurry, which was very fluid, was then filtered with vacuum, the wax cake on the filter being washed with about 0.5 volume of the same solvent mixture which had been pre-chilled to —10° F.

The filtration was rapid, the wax cake showing no tendency to crack on the filter and perfect washing being obtained. The filtrate and oily wash solvent were combined and freed of solvent by distillation. A yield of about 76% of wax-free oil was obtained which had a pour point of 0° F. The wax cake was also freed of solvent and was treated with 3% of filter clay at 350° F. It was then water-white in color, had a melting point of 140° F. (Galician) and a specific gravity at 60° F. of 0.860. This was then fractionated into higher melting point and lower melting point wax fractions by dispersion in about 3 volumes of methyl ethyl ketone at a temperature of about 110° F. and filtering the mixture. The filtrate and wax cake were freed of solvent. From the filtrate, a wax melting at 125° F. was obtained in an amount representing 30% of the wax processed. The wax cake on the filter gave a wax melting at 154° F.

The foregoing exemplary description of my invention is not to be considered as limiting since many variations may be made within the scope of the following claims by those skilled in the art without departing from the spirit thereof. It will be observed that in the foregoing description of the drawing, I have shown only single pieces of apparatus for carrying out the process. It is to be understood that duplicate equipment may be provided where necessary, which may be operated alternately so that the process may be carried out more or less continuously.

I claim:

1. A process for the separation of wax-oil mixtures which are solid at the herein described temperature of wax separation which comprises bringing said mixture to a state wherein the wax present is substantially completely dissolved in the oil present in said mixture, slowly cooling said wax-oil solution with slow agitation and in the absence of any diluent to a temperature sufficiently low to crystallize a portion of the wax and to produce a mass which is fluid at said cooling temperature, commingling said cooled fluent wax-oil mass with a cooled solvent to dissolve the oil present and separating the solvent solution of oil from the crystallized wax.

2. A process for the separation of wax-oil mixtures which are solid at the herein described temperature of wax separation which comprises bringing said oil to a state wherein the wax present is substantially completely dissolved in the oil present in said mixture, slowly cooling said wax-oil solution to crystallize wax with slow agitation in the presence of a quantity of a diluent sufficient to reduce the viscosity of the waxy-oil but insufficient in amount to maintain the waxy oil fluid at the dewaxing temperature in the absence of said agitation, commingling said cooled mixture containing crystallized wax with a cooled solvent for the oil present in said cooled mixture and separating the solvent solution of oil from the crystallized wax.

3. A process as claimed in claim 1 in which the solvent is a light hydrocarbon oil fraction.

4. A process as claimed in claim 1 in which the solvent is one of the members selected from the class consisting of acetone and methyl-ethyl-ketone.

5. A process for the separation of wax-oil mixtures which are solid at the herein described temperature of wax separation which comprises bringing said mixture to a state wherein the wax present is substantially completely dissolved in the oil present in said mixture, slowly cooling said wax-oil solution with slow agitation and in the absence of any diluent to a temperature sufficiently low to crystallize a portion of the wax and to produce a mass which is fluid at said cooling temperature, commingling said cooled fluent wax-oil mass with a cooled solvent to dissolve the oil present and filtering the solvent solution of oil from the crystallized wax.

6. A process for the separation of wax-oil mixtures which are solid at the herein described temperature of wax separation which comprises bringing said oil to a state wherein the wax present is substantially completely dissolved in the oil present in said mixture, slowly cooling said wax-oil solution to crystallize wax with slow agitation in the presence of a quantity of a diluent sufficient to reduce the viscosity of the waxy-oil but insufficient in amount to maintain the waxy oil fluid at the dewaxing temperature in the absence of said agitation, commingling said cooled mixture containing crystallized wax with a cooled solvent for the oil present in said cooled mixture and filtering the solvent solution of oil from the crystallized wax.

VANCE N. JENKINS.